United States Patent

[11] 3,576,489

| [72] | Inventors | Kenneth J. Law<br>Southfield;<br>Gordon R. Brown, Livonia, Mich. |
|---|---|---|
| [21] | Appl. No. | 806,826 |
| [22] | Filed | Mar. 13, 1969 |
| [45] | Patented | Apr. 27, 1971 |
| [73] | Assignee | J. K. Law Engineers, Inc.<br>Detroit, Mich. |

[54] PHASE DETECTION AND COMPARISON APPARATUS FOR DETERMINING THE PHASE DERIVATIVE WITH RESPECT TO FREQUENCY OF AN EDDY CURRENT TEST SIGNAL
3 Claims, 2 Drawing Figs.

| [52] | U.S. Cl. | 324/40 |
| [51] | Int. Cl. | G01r 33/12 |
| [50] | Field of Search | 324/40, 37, 34 (Cursory) |

[56] References Cited
UNITED STATES PATENTS
3,464,002  8/1969  Hentschel.................... 324/40
FOREIGN PATENTS
479,705  12/1951  Canada ..................... 324/34S Primary Examiner—Rudolph V. Rolinec
Assistant Examiner—R. J. Corcoran
Attorney—Donnelly, Mentag and Harrington ABSTRACT: An electronic eddy current apparatus for detecting and displaying the phase derivative with respect to frequency of an eddy current flux responsive coil signal. A frequency modulated input is applied to a phase detection and comparison system, the output of which is filtered to separate the carried phase component from the phase modulation component, and the phase modulation component is applied to a suitable indicating device to display the phase derivative with respect to frequency. This signal is indicative of electrical properties of a test piece which are affected by microstructure, alloy, and so forth of the test piece.

Patented April 27, 1971

3,576,489

INVENTORS.
KENNETH J. LAW
BY GORDON R. BROWN

Donnelly, Mentag & Harrington

ATTORNEYS 3,576,489

PHASE DETECTION AND COMPARISON APPARATUS FOR DETERMINING THE PHASE DERIVATIVE WITH RESPECT TO FREQUENCY OF AN EDDY CURRENT TEST SIGNAL

SUMMARY OF THE INVENTION

This invention relates to an electronic apparatus for electromagnetically determining the physical characteristics of a test piece.

Heretofore, various types of electromagnetic apparatuses have been provided for determining the physical characteristics, as hardness, of solid test parts. Examples of apparatuses of this type are disclosed in such U.S. Pats. as the Irwin U.S. Pat. No. 2,945,176, the Safferling U.S. Pat. No. 2,952,806, and the Callan U.S. Pat. 2,797,386. The prior art devices disclosed in these patents are subject to numerous disadvantages. We have heretofore invented a testing apparatus which overcomes such disadvantages and which is shown in our copending and allowed U.S. application Ser. No. 381,850, entitled "Eddy Current Apparatus for Testing the Hardness of a Ferromagnetic Material," and which has issued as U.S. Pat. No. 3,434,048. We have found that our aforementioned eddy current apparatus functions very well for separating test pieces on a carrier phase component basis. However, we have found that this apparatus is limited when testing certain materials, as for example, certain case hardened materials for example, materials with carbon added only to the surface layer which require a selected frequency for limited depth of penetration, and at this selected frequency there may be no phase difference between the signals for a properly hardened test piece and a softer test piece. Accordingly, at the frequency required, very little difference between the two signals would be apparent, and it is difficult to separate sample test pieces which are very similar in material, heat treat and other properties.

We have found that the meter readings at two close but different frequencies i $f_1$ and $f_2$ gave a better indication of the condition of the part being tested in terms of the differences in the meter readings at $f_1$ and $f_2$ for each part tested. It was, therefore, concluded that by modulating the fixed frequency over a range of frequencies, for example, $f_1$=500 cycles per second to $f_2$=700 cycles per second, at a second frequency much lower than the fixed frequency, these differences, that is, $\Delta\Phi$ of FIG. 2, could be displayed on an alternating current meter of the iron vane type or similar means and used to shown the condition of the parts being tested.

In view of the foregoing, it is an important object of this invention to provide a novel and improved electronic apparatus for testing the physical characteristics of test pieces which overcomes the aforementioned disadvantages of the prior art apparatuses.

Briefly, in accordance with the invention, we provide a testing apparatus which includes a flux producing coil for producing a magnetic flux in a test piece, a variable frequency voltage source connected to said flux producing coil to provide said flux producing coil with a frequency modulated carrier input, a flux responsive detection coil coupled to the test piece and to said flux producing coil to determine the characteristics of the flux produced in the test piece, a phase detection and comparison system connected to said flux producing coil and said flux responsive coil for generating a phase derivative signal with respect to frequency, $\Delta\Phi/\Delta f$ that constitutes an indication of a physical characteristic of the test piece and which signal includes carrier phase and phase derivative components, filter means connected to said phase detection and comparison system for separating the carrier phase components, and meter means connected to said filter means to provide a visual indication of phase derivation components of the physical characteristic indication signal.

Other objects, features and advantages of this invention will be apparent from the following detailed description, appended claims, and the accompanying drawing.

DESCRIPTION OF THE PREFERRED EMBODIMENT

Figure 1:
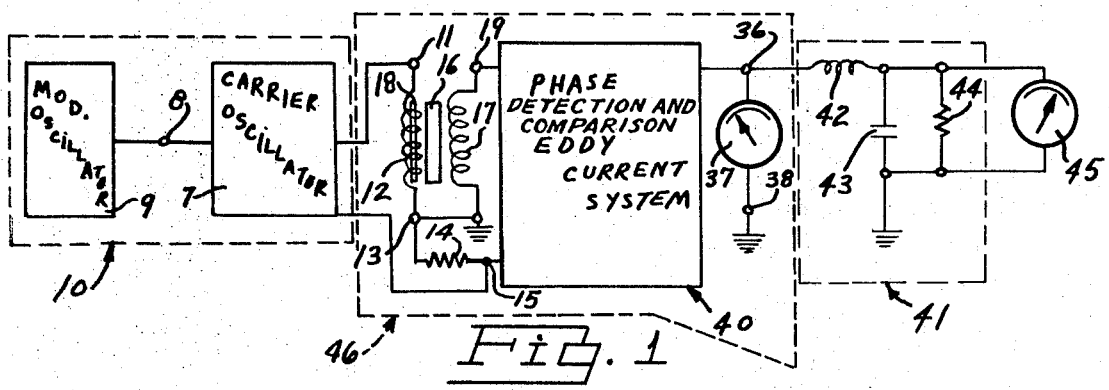
FIG. 1 is a combined schematic and block diagram of an illustrative embodiment of the invention.

Referring now to the drawing, and in particular to FIG. 1, wherein is shown an illustrative embodiment of the invention, the numeral 10 generally designates a variable frequency voltage source which is connected to a terminal 11 of a flux producing coil 12 for producing a magnetic flux in a rectangular ferrous test piece 16. The hardness or another physical characteristic of the test piece 16 is to be determined in comparison to a previously tested standard comprising a like metal member of known characteristics (not shown). A flux responsive detection coil 17 is connected to the ground terminal 13, and it is electromagnetically coupled to the flux producing coil 12 through the test piece 16. The flux between the flux responsive detection coil 17 and the flux producing coil 12 may be coupled through an intermediate ferrite core 18. The assembly of coils 12 and 17 may be termed a probe. A second connection to the variable frequency oscillator 10 is made to terminal 15 through a resistor 14 to provide a reference input to the system.

As shown in FIG. 1, the terminal 19 of the flux responsive coil 17 and the terminal 13 are connected to the input end of a phase detection and comparison system 40 which generates a phase difference signal that constitutes a hardness or another physical characteristic indication of the test piece. A suitable phase measurement system 46 of the type adapted to carry out the function of the system 40 is shown and described in our prior aforementioned U.S. Pat. No. 3,434,048, in FIGS. 1 and 3, and the disclosure of said FIGS. 1 and 3 of U.S. Pat. No. 3,434,048 is incorporated herein by reference. U.S. Pat. No. 3,434,048 and this application are commonly owned by the same assignee. The aforementioned flux coils 12 and 17 are also shown and described in detail in U.S. Pat. No. 3,434,048. In U.S. Pat. No. 3,434,048 the flux producing coil 12 is connected to a fixed frequency voltage source as distinguished from the variable frequency voltage source 10 of the present invention.

As shown in FIG. 1, the variable frequency voltage source 10 comprises a voltage controlled oscillator or carrier oscillator 7 which is connected to the terminal 11 of the flux producing coil 12 and to terminal 15 of resistor 14. Any suitable voltage controlled oscillator 7 may be employed, as for example, a Wavetek oscillator Model 111 voltage controlled oscillator obtainable from the Wavetek Company of 8159 Engineer Road, San Diego, Calif. The voltage controlled oscillator is frequency modulated by a modulating signal produced by the modulator oscillator 9 which is connected to the terminal 8 of the carrier oscillator 7. The modulator oscillator 9 may be any suitable oscillator available on the market, as for example, a model HP 200 CD available from the Hewlett Packard Company of Palo Alto, Calif.

As shown in FIG. 1, output terminal 36 of the phase detection and comparison system 40 is connected to a meter unit 37 which is connected to the ground terminal 38. The meter unit 37 is a standard DC indicating type or permanent magnet type D'Arsonval meter. Also connected to the phase detection and comparison system output terminal 36 is a smoothing filter circuit generally indicated by the numeral 41. The filter 41 is a low-pass filter and is illustrated as comprising the coil 42, capacitor 43 and resistance 44. The filter 41 may be a simple L–C type as illustrated or a more complex active filter with greater attenuation above the desired cutoff frequency.

The output of the filter 41 goes into a second meter 45 which may be a simple AC instrument meter of the movable iron vane type meter.

In operation, the carrier oscillator 7 would be adjusted for a typical operating frequency, as for example 600 cycles. The modulator oscillator 9 would be set for a suitable modulating frequency, as for example 30 cycles per second. The carrier information would be supplied by the 600 cycles. The meter 37 would measure the carrier phase information, in the the same manner as it functioned in the circuit of FIGS. 1 and 3 of U.S. Pat. No. 3,434,048. The low-pass filter 41 has frequency characteristics such that it attenuates very heavily the carrier frequency of 600 cycles and yet allows the 30-cycle waves to pass through to the meter 45.

Figure 2:
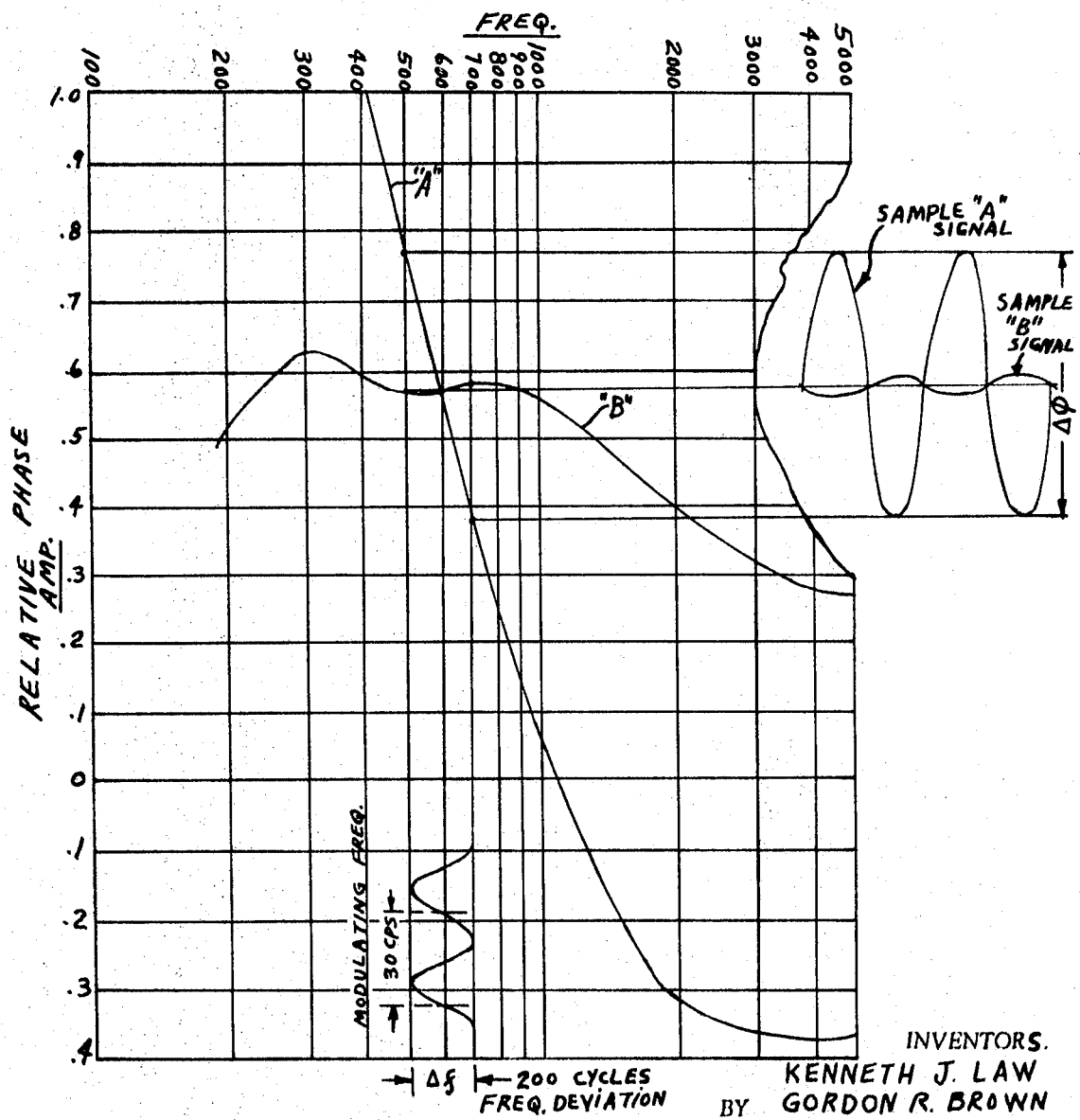
FIG. 2 is a graphic illustration of phase measurements obtained with the test apparatus of the present invention on a particular type steel with different heat treat conditions; and a graphical illustration is included to show how the phase derivative signal will respect to frequency, $\Delta\Phi/\Delta f$, is obtained.

The meter 45 would display any deviation of the carrier phase reading at a 30-cycle rate. The meter 45 should read zero when no test piece 16 is in the presence of the coils 12 and 17. The modulator oscillator 9 is adjusted for the proper frequency deviation, as for example 200 cycles as shown on the graph of FIG. 2. The illustrated deviation of 200 cycles may be set up by monitoring the output of the carrier oscillator 7 with an oscilloscope and determining the minimum and maximum periods of the wavelength. The system can then be calibrated with the dial readings on both oscillators 7 and 9 to obtain repeatable settings from thereon. The test piece 16 to be tested, of unknown material, is brought into the influence of the probe comprising the coils 12 and 17, and a reading will be produced on the meter 45. As shown in FIG. 2, the two test pieces A and B can be readily separated by the differences in the two signals, which differences appear in the slopes of the phase characteristics of the test pieces. The modulation technique of the present invention allows the separation of test pieces which could not separated on a carrier phase basis. The physical characteristics determinable by said electronic apparatus include hardness, heat treat analysis, alloy analysis, conductivity, related electrophysical parameters of materials, and physical characteristics such as seams, cracks, inclusions, and so forth.

It will be understood that the modulation would not have to be sinusoidal frequency modulation. It could be sweep modulation wherein the modulator oscillator 9 would be a triangular wave generator, or a sawtooth wave generator or any waveform generator which would sweep the variable frequency oscillator the required spectrum to obtain the complete frequency and complete phase information over the full desired frequency range for the sample test piece.

In the last-mentioned instance a suitable wider bandwidth phase measurement system 40, than that shown in our U.S. Pat. No. 3,434,048, would be used, such as the phase measurement system employed in the "VERIMENT" model M900 hardness tester manufactured by K. J. Law Engineers, Inc., of 26341 West 8-Mile Road, Detroit, Mich.

While it will be apparent that the preferred embodiment of the invention herein disclosed is well calculated to fulfill the objects above-stated, it will be appreciated that the invention is susceptible to modification, variation and change.

We claim:

1. In an electronic eddy current testing apparatus for electromagnetically determining the physical characteristics of a test piece, the combination comprising:
   a. a probe coupled to a test piece and comprising a flux producing coil and a flux responsive detection coil, said coils being inductively coupled together through said test piece;
   b. a frequency modulated alternating current source connected to a current reference resistor to generate a reference voltage signal and to said flux producing coil to provide said flux producing coil with a frequency modulated input including carrier components and modulation components;
   c. a phase detection and comparison system means connected to said flux responsive coil and current reference resistor for comparing the phase of the signal from said flux responsive coil and the reference voltage signal the resultant signal of the compared flux responsive coil signal and the voltage reference signal constituting an indication of a physical characteristic of the test piece, and which resultant signal includes carrier phase components and phase derivative components with respect to frequency;
   d. filter means connected to said phase detection and comparison system means for separating the carrier phase components from the phase derivative components; and,
   e. meter means connected to said filter means to provide a visual indication of the phase derivative components of said signal.

2. An electronic eddy current testing apparatus as defined in claim 1, wherein:
   a. said frequency modulated alternating current source includes,
      1. a carrier oscillator connected to said flux producing coil; and,
      2. a modulator oscillator connected to said carrier oscillator.

3. An electronic eddy current testing apparatus as defined in claim 1, wherein:
   a. said phase detection and comparison system means is of sufficient bandwidth to respond to the modulation components of the signal.

PO-1050
(5/69)

UNITED STATES PATENT OFFICE
CERTIFICATE OF CORRECTION

Patent No. 3,576,489           Dated   April 27, 1971

Inventor(s) Kenneth J. Law and Gordon R. Brown

It is certified that error appears in the above-identified patent and that said Letters Patent are hereby corrected as shown below:

Column 1, line 39, before "$f_1$" cancel "i". Column 3, line 6, last word in the line ("the") should be canceled. Column 3, line 20, "wavelength" should be -- wave length --. Column 3, line 45, "bandw should be -- band width --. Column 3, line 48 "VERIMENT" should be -- VERIMET --. Column 4, line 47, "bandwidth" should be -- band width --.

Signed and sealed this 17th day of August 1971.

(SEAL)
Attest:

EDWARD M. FLETCHER, JR.          WILLIAM E. SCHUYLER, JR
Attesting Officer                Commissioner of Patents